(12) United States Patent
Hong et al.

(10) Patent No.: US 10,352,524 B1
(45) Date of Patent: Jul. 16, 2019

(54) LIGHT AND THIN TAIL LAMP

(71) Applicant: Laster Automotive Technology (Shanghai) Co., Ltd., Shanghai (CN)

(72) Inventors: Chang'an Hong, Shanghai (CN); Ze Ma, Shanghai (CN)

(73) Assignee: Laster Automotive Technology (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/027,389

(22) Filed: Jul. 5, 2018

(30) Foreign Application Priority Data

May 31, 2018 (CN) .......................... 2018 1 0544792

(51) Int. Cl.
| | |
|---|---|
| *F21S 43/236* | (2018.01) |
| *F21V 13/04* | (2006.01) |
| *F21S 43/242* | (2018.01) |
| *B29C 45/16* | (2006.01) |
| *B29C 45/14* | (2006.01) |
| *F21S 43/14* | (2018.01) |
| *F21V 17/00* | (2006.01) |
| *F21V 19/00* | (2006.01) |

(52) U.S. Cl.
CPC ............ *F21S 43/236* (2018.01); *B29C 45/14* (2013.01); *B29C 45/16* (2013.01); *F21S 43/14* (2018.01); *F21S 43/242* (2018.01); *F21V 13/04* (2013.01); *F21V 17/00* (2013.01); *F21V 19/00* (2013.01)

(58) Field of Classification Search
CPC ........ F21S 43/236; F21S 43/14; F21S 43/242; B29C 45/14; B29C 45/16; F21V 13/04; F21V 19/00; F21V 17/00
See application file for complete search history.

(56) References Cited

U.S. PATENT DOCUMENTS

2009/0273946 A1* 11/2009 Liu ................... G02F 1/133604
 362/607
2017/0205572 A1* 7/2017 Nichol ................. G02B 6/0028

FOREIGN PATENT DOCUMENTS

| CN | 202992973 U | 6/2013 | |
|---|---|---|---|
| TW | 201205004 A1 * | 2/2012 | |
| WO | WO-2012122511 A1 * | 9/2012 | ........... G02B 6/0028 |

* cited by examiner

*Primary Examiner* — Anh T Mai
*Assistant Examiner* — Glenn D Zimmerman

(57) ABSTRACT

The present invention discloses a light and thin tail lamp comprising a light guide structure and a lampshade, wherein the light guide structure is arranged in the lampshade, one surface of the light guide structure is an emergent surface, and the other surface of the light guide structure is a reflective surface; two incident surfaces are arranged on opposite positions at two sides of the light guide structure, at least one of the incident surfaces is provided with light sources, and rays emitted from the light sources enter the light guide structure through the incident surfaces; and the light sources are connected with a control circuit. The light and thin tail lamp disclosed by the present invention is reasonable in design, small in thickness, size and occupied space, and convenient to mount; and the light and thin tail lamp is high in brightness, uniform in light emergence and non-dazzling.

11 Claims, 7 Drawing Sheets

LIGHT AND THIN TAIL LAMP

CROSS REFERENCES TO RELATED APPLICATION

This application claims priority of Chinese Patent Application No. 201810544792.7 filed on May 31, 2018, the entire content of which is hereby incorporated by reference.

TECHNICAL FIELD

The present invention relates to the field of tail lamps of motor vehicles and particularly relates to a light and thin tail lamp.

BACKGROUND

A tail lamp of the motor vehicle mainly has the functions such as a brake lamp, a steering lamp and a reversing lamp and is used for warning a rear motor vehicle. The tail lamp mainly comprises a cavity, a lampshade and a light source mounted in the cavity, an incandescent lamp is generally adopted as the light source, and light is emitted by a reflecting mirror in the cavity through the lampshade.

With the scientific and technological progress and the increment of material demands of people, the old tail lamp cannot meet the demands of people gradually and mainly has defects on the following aspects:

(1) the space in the cavity of the tail lamp is larger, the reflecting mirror is required to be designed according to a lamp bulb so as to be generally larger in size and weight and inconvenient to maintain and replace and occupy large space when being mounted;

(2) the tail lamp is divided into a plurality of independent regions for respectively mounting the brake lamp, the steering lamp, the reversing lamp and the like, the lampshade adopts different optical filters, and therefore, the tail lamp is troublesome in mounting and poor in integrity;

(3) an ordinary incandescent lamp bulb is high in energy consumption, short in life and nonuniform in light emergence, and the emitted light is relatively dazzling; and (4) the incandescent lamp bulb is larger and is relatively conspicuous in the lampshade so as to affect the aesthetic degree of the whole vehicle.

For solving the problems, the Chinese patent with the publication number of CN202992973U discloses an LED tail lamp for a vehicle, which adopts an LED lamp bulb instead of the existing incandescent lamp bulb, rays emitted from the LED lamp bulb are reflected from the respective corresponding reflecting regions after being refracted by respective corresponding refracting grooves, and the surface of a reflecting bowl is a concave-convex surface, so that the light reflecting effect is guaranteed, meanwhile, the LED lamp bulb has concealment, and the aesthetic degree of the tail lamp is improved; and the LED tail lamp has the characteristics of saving energy, reducing emission, being fashionable and simple and reliable in structure, and the like.

Although the light source is optimized to a certain extent in the contrastive patent, there is still a lack of uniformity in the light emergence, and a plurality of LED lamp bulbs emit light, so that transmitted rays may have a certain dark regions; although the LED lamp bulbs have certain concealment, but serve as point light sources to be still relatively dazzling during light emergence; in addition, the whole tail lamp is still slightly large in size and inconvenient to maintain and replace and occupies a large space.

SUMMARY OF THE INVENTION

The present invention aims at providing a light and thin tail lamp which is reasonable in structural design and has the advantages of light weight, thinness, small size and good light emergence effect in order to overcome the defects in the prior art.

The technical purpose of the present invention is achieved by the following technical solution: a light and thin tail lamp comprises a light guide structure and a lampshade, wherein the light guide structure is arranged in the lampshade, one surface of the light guide structure is an emergent surface, and the other surface of the light guide structure is a reflective surface; two incident surfaces are arranged on opposite positions at two sides of the light guide structure, at least one of the incident surfaces is provided with light sources, and rays emitted from the light sources enter the light guide structure through the incident surfaces; and the light sources are connected with a control circuit.

The light guide structure is made of an optical material which is high in refractive index and small in thickness and is generally a light guide plate, the light guide structure is mounted in the lampshade, and the light sources are located at the sides of the light guide structure, so that the whole tail lamp is effectively reduced in thickness, reduced in size, small in occupied space and convenient to mount, maintain and replace.

The light sources are incident from the incident surfaces at two sides of the light guide structure, the rays are uniformly emitted from the whole emergent surface after being reflected by the reflective surface and refracted by the emergent surface, and bright, uniform and soft light is emitted, so that the light sources are high in brightness, good in effect on prompting a rear vehicle and non-dazzling.

The lampshade is generally made of an optical material with a low refractive index, the light emitted from the emergent surface is secondarily refracted by the lampshade, however, the direction of the rays reflected by the reflective surface cannot be changed, and thus, the light is emitted uniformly and centrally.

Compared with the prior art, the tail lamp has the advantages that the light guide structure is adopted, and the light sources are arranged at the sides of the light guide structure, so that not only is the size of the whole tail lamp reduced, but also the light sources arranged at the sides of the light guide structure are strong in concealment and cannot be seen from the outside through the lampshade, and therefore, the aesthetic degree of the whole vehicle is improved. A high-energy-consumption incandescent lamp or a combination of a plurality of LED lamp bulbs is adopted in the prior art to result in high energy consumption and more faults, however, the light guide structure is high in light utilization rate and low in light loss, therefore, the brightness index of the tail lamp may be reached by only mounting a small amount of light sources at the sides of the light guide structure, and furthermore, more energy is saved.

The control circuit is used for controlling the lighting forms of the light sources and providing indications for the rear vehicle, which are specifically embodied as a brake lamp, a steering lamp and a reversing lamp.

Preferably, the light guide structure comprises a plurality of light guide regions, each of the light guide regions is provided with the light sources, and spacing strips are arranged between every two adjacent light guide regions.

According to the technical solution, the plurality of light guide regions are respectively used for indicating different functions, such as the brake lamp, the steering lamp and the reversing lamp, of the tail lamp, the structure is simple, and all the functions are integrated on a piece of tail lamp, so that the whole tail lamp is better in integrity, more aesthetic and lower in cost; and the spacing strips are used for spacing light to prevent the light with different colors in the adjacent light guide regions from being interspersed.

Preferably, each of the light guide regions corresponds to one of the light sources with different colors.

Due to the adoption of point light sources in the prior art, the point light sources are required to be converted into specific colors by optical filters, meanwhile, the lighting effect may be better shown, and the point light sources are not so dazzling. However, the light sources emitted by the light guide structure are surface light sources which may provide clear enough light indications for the rear vehicle, are bright and soft in rays and are not needed to be converted in color by the optical filters, and thus, the lampshade is not needed to be limited to the color of an indication lamp, may be designed by matching with the type of the vehicle, is only required to meet the requirement for the light transmitting effect and is more aesthetic.

Preferably, the light guide structure is formed by splicing a plurality of strip-shaped light guide strips side by side, and each of the light guide strips corresponds to one independent light source.

According to the technical solution, each of the light sources lights one of the light guide strips, the whole light guide structure is more uniform in light emitting and free of dark regions, meanwhile, each of the light guide strips may be independently controlled by the control circuit, and the different light guide strips are enabled to emit light with different colors according to the colors of the light sources, so that the different regions of the light guide structure are subjected to different light indications to form dynamic lighting; one of the light guide regions may be formed by one or a plurality of light guide strips with the same light source color, the light guide strips in the same light guide region may be arranged continuously or non-continuously, and a plurality of light guide regions respectively indicate different light functions; in addition, the light guide strips may be independently replaced if being damaged, but it is not needed to replace the whole light guide structure, so that the maintenance cost is lower.

Preferably, the spacing strips for spacing the light guide strips are arranged between every two adjacent light guide strips.

According to the technical solution, due to the adoption of the spacing strips, no mutual influences are generated between light emitted by the adjacent light guide strips, for example, red light emitted by the brake lamp and yellow light emitted by the steering lamp cannot be interspersed together, so that the color is more pure and the indication is clearer.

Preferably, the spacing strips are fixed on the lampshade, the spacing strips and the lampshade form mounting grooves of the light guide strips, and the light guide strips are mounted in the mounting grooves.

According to the technical solution, the spacing strips may also be used for playing a role in fixing the light guide strips while spacing the light guide strips, the light guide strips are directly clamped into the mounting grooves to be fixed, and other mounting structures are not required to be designed, so that the light guide strips are convenient to mount and dismount. Preferably, the spacing strips and the lampshade are made of the same material, and the spacing strips are used as a part of the lampshade and are integrally molded with the lampshade.

Preferably, the spacing strips and the lampshade are made of the same material, and the spacing strips are used as a part of the lampshade and are integrally molded with the lampshade.

According to the technical solution, it is more convenient to achieve integral molding, and the spacing strips cannot fall off; and the spacing strips are also made of a material with a low refractive index, the rays in the light guide structure may be totally reflected when being refracted from a material with a high refractive index to the spacing strips, and only a small amount of rays may pass through the spacing strips to result in no influences, so that the spacing strips with low refractive indexes may play a role in insulating the rays, and light among the different light guide strips cannot be interspersed.

Preferably, the light guide structure with a high refractive index is molded on the lampshade with a low refractive index by using a molding process. The tail lamp is simple in molding process, low in cost and not easy to disconnect, and the properties such as aesthetic degree and assembly of the tail lamp are improved.

Preferably, the light guide structure is an arc-shaped structure.

The tail parts of various types of vehicles are designed to be different, the mounting positions of tail lamps are also different, some tail lamps are required to be mounted at corners, and therefore, the light guide structure is required to be designed to be arc-shaped to match with the structure of the tail of each vehicle, and meanwhile, the radian of the lampshade is also consistent with that of the light guide structure.

Preferably, the reflective surface is provided with reflecting fringes.

The reflecting fringes are used for reflecting the rays, and when being reflected on the reflecting fringes, the rays may be reflected towards a required direction and then emitted by the emergent surface of the light guide structure after a total reflection condition is destroyed. The reflective surface in the light guide structure is used for reflecting light emitted to the reflective surface back to the inside of the light guide structure and forming total reflection to provide input rays for the reflecting fringes at a rear section, and such circulation is made to the end, so that most of light energy may be reflected, furthermore, the utilization rate of the light is increased, and the brightness is improved.

In conclusion, the light and thin tail lamp has the following beneficial effects of small thickness, size and occupied space and convenience in mounting; and the light and thin tail lamp is high in brightness, uniform in light emergence and non-dazzling.

DETAILED DESCRIPTION OF THE INVENTION

The present invention is further described in detail below in combination with the accompanying drawings.

Embodiment 1

Figure 1:
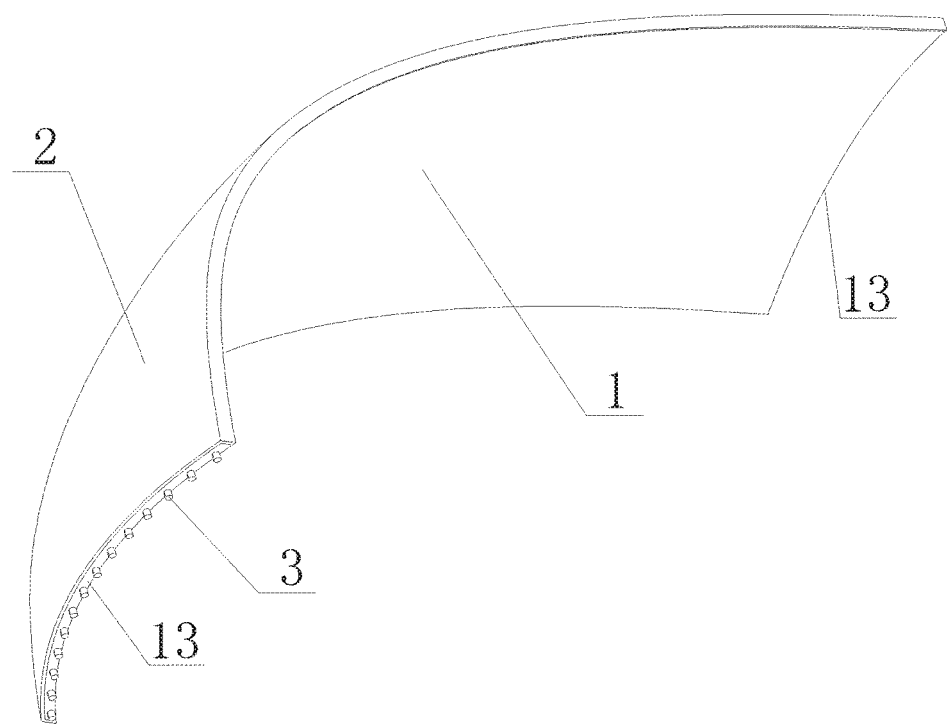
FIG. 1 is a structural schematic diagram of an embodiment 1.
Figure 2:
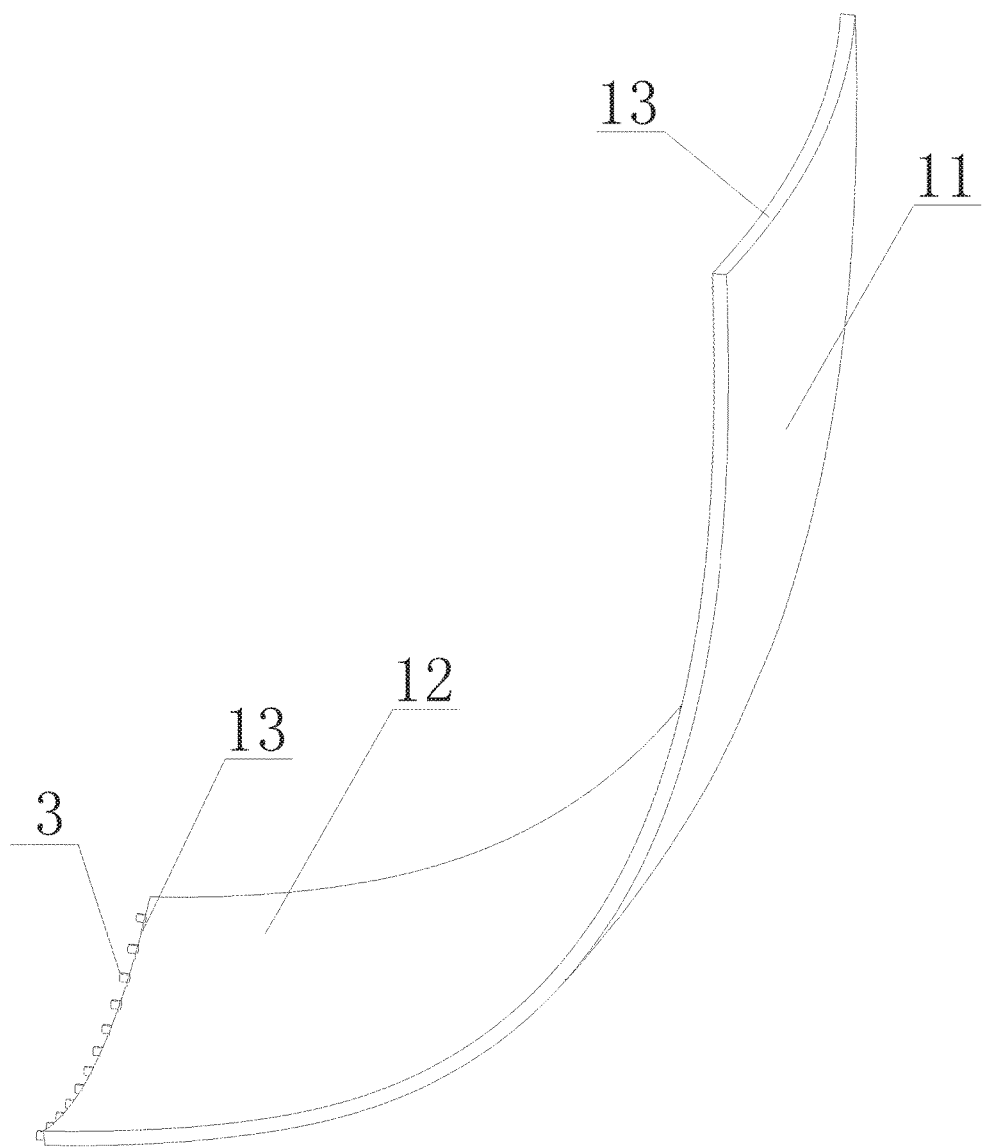
FIG. 2 is a structural schematic diagram of the embodiment 1 in which a lampshade is removed.

Refer to FIG. 1 to FIG. 2, the embodiment comprises a light guide structure 1 and a lampshade 2, wherein the light guide structure 1 is arranged in the lampshade 2, one surface of the light guide structure 1 is an emergent surface 11, and the other surface of the light guide structure 1 is a reflective surface 12; and two incident surfaces 13 are arranged on opposite positions at two sides of the light guide structure 1, one of the incident surfaces 13 is provided with LED light sources 3, rays emitted from the LED light sources 3 enter the light guide structure 1 through the incident surfaces 13, and the LED light sources 3 are connected with a control circuit.

The light guide structure 1 is made of an optical material which mainly adopts PC with high refractive index and small thickness designed to be within 1 cm as required, and therefore, the light guide structure 1 is also generally called light guide plate. The light guide structure 1 is mounted in the lampshade 2, and the LED light sources 3 are located at the sides of the light guide structure 1, so that the whole tail lamp is effectively reduced in thickness, reduced in size, small in occupied space and convenient to mount, maintain and replace.

The LED light sources 3 are incident from the incident surfaces 13 at two sides of the light guide structure 1, the rays are uniformly emitted from the whole emergent surface 11 after being reflected by the reflective surface 12 and refracted by the emergent surface 11, and bright, uniform and soft light is emitted, so that the light sources are high in brightness, good in effect on prompting a rear vehicle and non-dazzling.

The lampshade 2 is generally made of an optical material with a low refractive index, the light emitted from the emergent surface 11 is secondarily refracted by the lampshade 2 with equal thickness, so that some diffusive rays may be converged, however, the direction of the rays reflected by the reflective surface cannot be changed, and thus, the light is emitted uniformly and centrally.

In the embodiment, the emergent surface 11 of the light guide structure 1 is fitted with the inner surface of the lampshade 2 and is in tight contact with the inner surface of the lampshade 2, and the design of a cavity of an ordinary tail lamp is removed, so that the whole tail lamp is smaller in thickness, small in occupied space and lighter in weight; and light directly passes through the lampshade 2 after being emitted from the light guide structure 1, and light loss caused by the cavity does not exist, so that the light emitting effect is better.

The lampshade 2 at the outer layer is made of a material with a low refractive index, and the light guide structure 1 at the inner layer is made of a material with a high refractive index, and the rays may be totally reflected in the material with the high refractive index when entering the material with the high refractive index, so that the rays may be transmitted from one side to the other side of the light guide structure 1, meanwhile, the light is reflected by a reflective surface, and the functions of various signal lamps may be met.

Compared with the prior art, the embodiment has the advantages that the light guide structure 1 is adopted, and the LED light sources 3 are arranged at the sides of the light guide structure 1, so that not only is the size of the whole tail lamp reduced, but also the LED light sources 3 arranged at the sides of the light guide structure 1 are strong in concealment and cannot be seen from the outside through the lampshade 2, and therefore, the aesthetic degree of the whole vehicle is improved. A high-energy-consumption incandescent lamp or a combination of a plurality of LED lamp bulbs is adopted in the prior art to result in high energy consumption and more faults, however, the light guide structure 1 is high in light utilization rate and low in light loss in the embodiment, therefore, the brightness index of the tail lamp may be reached by only mounting a small amount of light sources at the sides of the light guide structure 1, and furthermore, more energy is saved.

In the embodiment, the light guide structure 1 may be an arc-shaped structure.

The tail parts of various types of vehicles are designed to be different, the mounting positions of tail lamps are also different, some tail lamps are required to be mounted at corners, and therefore, the light guide structure 1 is required to be designed to be arc-shaped to match with the structure of the tail of each vehicle, and meanwhile, the radian of the lampshade 2 is also consistent with that of the light guide structure 1.

In the embodiment, the control circuit is a conventional circuit and is used for controlling the lighting forms of the LED light sources 3 and providing different indications for the rear vehicle, which are specifically embodied as a brake lamp, a steering lamp and a reversing lamp. For example, the tail lamp may emit light with specific colors by using the LED light sources 3 with specific colors or arranging the optical filters with specific colors on the lampshade 2, so that a corresponding indicating role is played.

During actual mounting, the tail lamp in the embodiment may indicate one color such as the brake lamp; and generally, three tail lamps may be mounted at the tail of the vehicle and are respectively used for indicating the brake lamp, the steering lamp and the reversing lamp.

Embodiment 2

The difference of the embodiment and the embodiment 1 lies in region division of the light guide structure 1.

Figure 3:
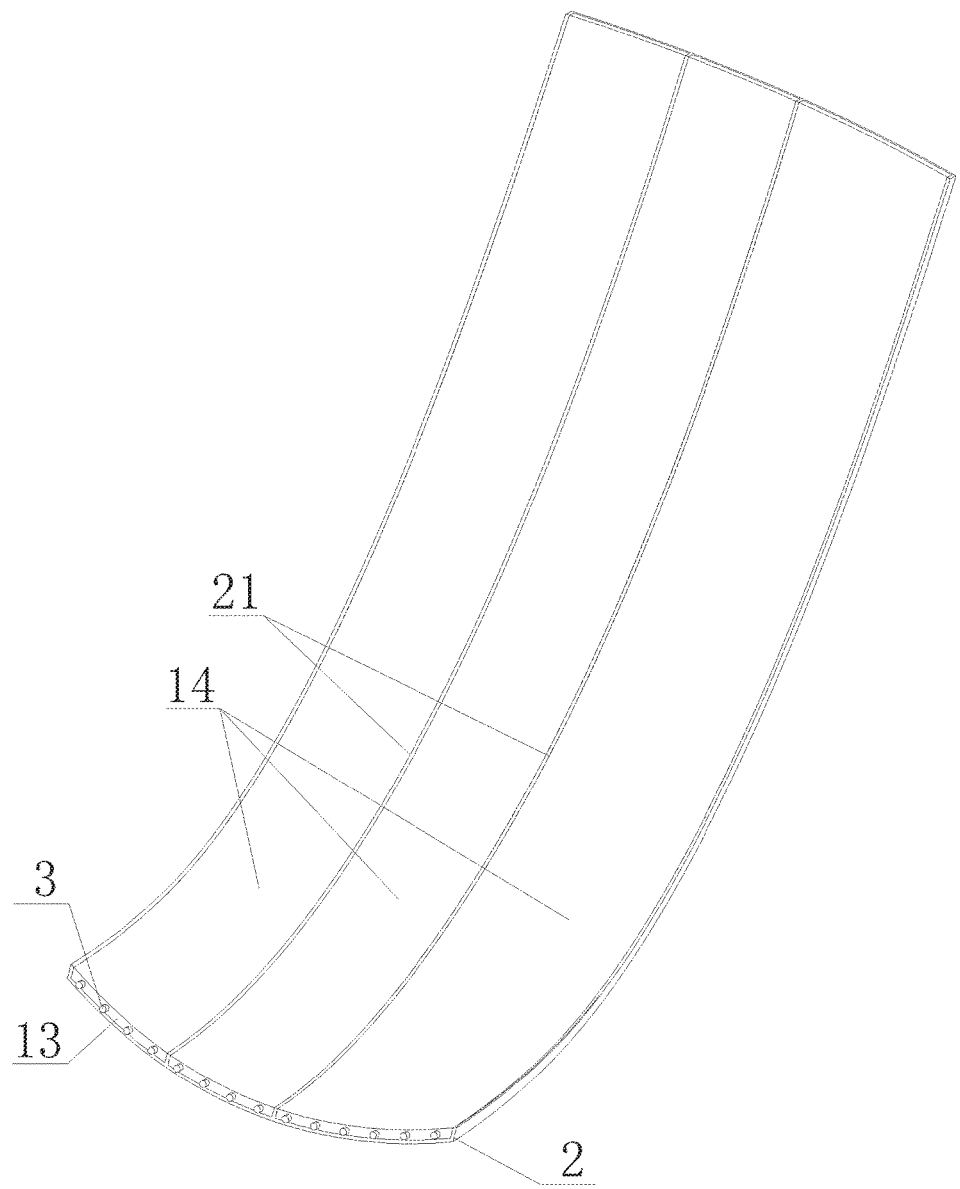
FIG. 3 is a structural schematic diagram of an embodiment 2.

Refer to FIG. 3, in the embodiment, the light guide structure 1 comprises three light guide regions 14, each of the light guide regions 14 is provided with light sources, and spacing strips 21 are snugly fitted between every two adjacent light guide regions 14. The three light guide regions 14 are respectively used for indicating the brake lamp, the steering lamp and the reversing lamp, and the three functions are integrated into one lampshade 2. the tail lamp is simple in structure and convenient to mount, and only one tail lamp is required to be mounted, so that the tail lamp is better in integrity and more aesthetic; and the spacing strips 21 are used for preventing light with different colors in the adjacent light guide regions 14 from being interspersed.

All the LED light sources 3 may adopt white light, the optical filters are respectively arranged in the regions, corresponding to the three light guide regions 14, on the lampshade 2 and are used for correspondingly emitting light with different colors, a red optical filter is adopted in the light guide region 14 corresponding to the brake lamp, a yellow optical filter is adopted in the light guide region 14 corresponding to the reversing lamp, no optical filters are adopted in the light guide region 14 corresponding to the steering lamp so that the white light directly passes through the light guide region 14 corresponding to the steering lamp, and the emitted light may be filtered by the corresponding optical filters to form corresponding colors which are absolutely clear.

The LED light sources 3 may also adopt specific colors so that no optical filters are required. Each of the light guide regions 14 corresponds to one of the LED light sources 3 with different colors, a red LED light source 3 is adopted in the light guide region 14 corresponding to the brake lamp, a yellow LED light source 3 is adopted in the light guide region 14 corresponding to the steering lamp, and a white LED light source 3 is adopted in the light guide region 14 corresponding to the reversing lamp.

Due to the adoption of the point light sources in the prior art, the point light sources may be converted into the surface light sources by optical filters, the lighting effect may be better shown, and the point light sources are not so dazzling. However, in the embodiment, the light sources emitted by the light guide structure are surface light sources which may provide clear enough light indications for the rear vehicle, are bright and soft in rays and may not be converted by the optical filters, and thus, the lampshade 2 is not needed to be limited to the color of an indication lamp, may be designed by matching with the type of the vehicle, is only required to meet the requirement for the light transmitting effect and is more aesthetic.

Embodiment 3

The difference of the embodiment and the embodiment 1 lies in overall design of the light guide structure 1.

Figure 4:
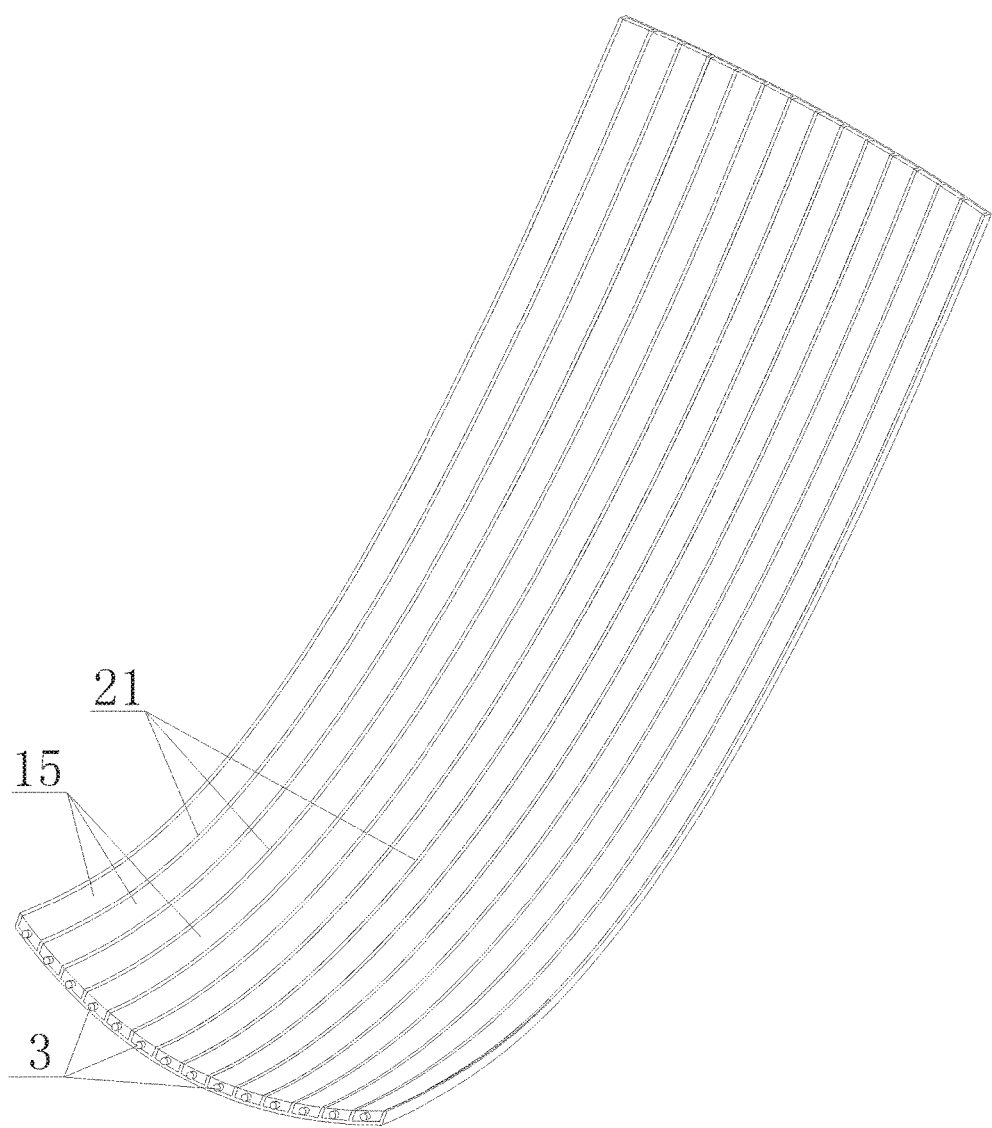
FIG. 4 is a structural schematic diagram of an embodiment 3.

Refer to FIG. 4, in the embodiment, the light guide structure 1 is formed by splicing a plurality of strip-shaped light guide strips 15 side by side, each of the light guide strips 15 corresponds to one independent light source, each of the light sources lights one of the light guide strips 15, the whole light guide structure 1 is more uniform in light emitting and free of dark regions, meanwhile, each of the light guide strips 15 may be independently controlled by the control circuit, and the different light guide strips 15 are enabled to emit light with different colors according to the colors of the light sources, so that the different regions of the light guide structure 1 are subjected to different light indications to form dynamic lighting; one of the light guide regions 14 may be formed by one or a plurality of light guide strips 15 with the same light source color, the light guide strips 15 in the same light guide region 14 may be arranged continuously or non-continuously, and a plurality of light guide regions 14 respectively indicate different light functions; in addition, the light guide strips 15 may be independently replaced if being damaged, but it is not needed to replace the whole light guide structure 1, so that the maintenance cost is lower.

When the color of the light is designed, parts of a plurality of adjacent continuous light guide strips 15 may be provided with the LED light sources 3 with the same color, for example, 15 light guide strips 15 are arranged side by side, 8 light guide strips at the upper part may be provided with red LED light sources 3, 4 light guide strips in the middle may be provided with yellow LED light sources 3, and 3 light guide strips at the lower part may be provided with white LED light sources 3, so that the brake lamp, the steering lamp and the reversing lamp are respectively displayed. Thus, during respective lighting, lighting regions are obviously distinguished, and the lighting effect is remarkable. The 8 red light guide strips 15 may also be separately displayed, for example, only two light guide strips at two sides are respectively lighted during normal lighting at night, then, the 4 light guide strips in the middle are lighted during braking, and thus, an obvious distinguishing indication may be provided for the rear vehicle.

Of course, the light guide strips 15 with various colors may also be arranged at intervals in order to achieve the individual design of the tail lamp, and the design is more novel and aesthetic so as to conform to the aesthetic appreciations of various users.

In the embodiment, the spacing strips 21 for spacing the light guide strips 15 are arranged between every two adjacent light guide strips 15. Due to the adoption of the spacing strips 21, no mutual influences are generated between light emitted by the adjacent light guide strips 15, for example, red light emitted by the brake lamp and yellow light emitted by the steering lamp cannot be interspersed together, so that the color is more pure and the indication is clearer.

Figure 5:
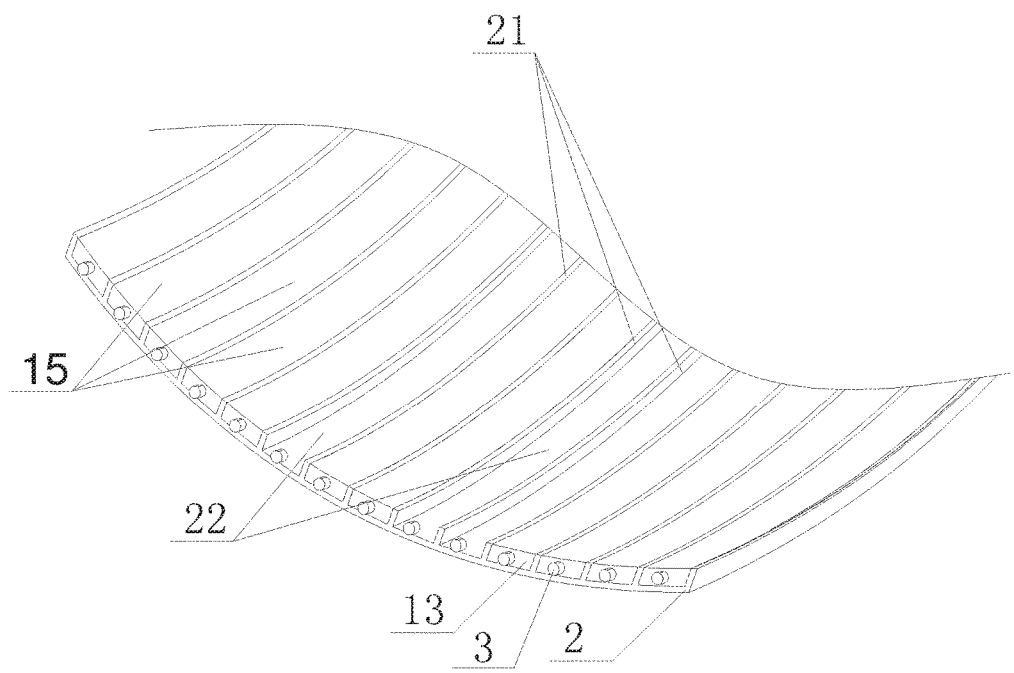
FIG. 5 is a structural schematic diagram of FIG. 4 in which parts of light guide strips are removed.

As shown in FIG. 5, the spacing strips 21 are fixed on the lampshade 2, the spacing strips 21 and the lampshade 2 form mounting grooves 22 of the light guide strips 15, and the light guide strips 15 are mounted in the mounting grooves 22. The spacing strips 21 may also be used for playing a role in fixing the light guide strips 15 while spacing the light guide strips 15, and the light guide strips 15 are directly clamped into the mounting grooves 22 to be fixed, so that the light guide strips 15 are convenient to mount and dismount. Other mounting structures may also be added appropriately to improve the fixing strength of the light guide strips 15.

Embodiment 4

The difference of the embodiment and the embodiment 3 lies in the molding processes of the light guide strips 15 and the spacing strips 21.

As shown in FIG. 5, in the embodiment, the spacing strips 21 and the lampshade 2 are made of the same material, the spacing strips 21 are used as a part of the lampshade 2 and are integrally molded with the lampshade 2. It is more convenient to achieve integral molding, and the spacing strips 21 cannot fall off; and the spacing strips 21 are also made of a material with a low refractive index, the rays in the light guide structure 1 may be totally reflected when being refracted from a material with a high refractive index to the spacing strips 21, and only a small amount of rays may pass through the spacing strips 21 to result in no influences, so that the spacing strips 21 with low refractive indexes may play a role in insulating the rays, and light among the different light guide strips 15 cannot be interspersed.

In the embodiment, the light guide structure 1 and the lampshade 2 are subjected to double-shot injection molding. Double-shot injection means that two different materials are injected into the same set of mold to achieve a molding process that an injection-molded part is made of two materials. The light guide structure 1 with the high refractive index is molded on the lampshade 2 with the low refractive index by double-shot injection, so that the tail lamp is simple in process, low in cost, capable of better embodying light weight and thinness and not easy to disconnect, and the properties such as aesthetic degree and assembly of the tail lamp are improved.

Embodiment 5

The difference of the embodiment and the embodiment 4 lies in the design of the reflective surface 12 in the light guide structure 1.

Figure 6:
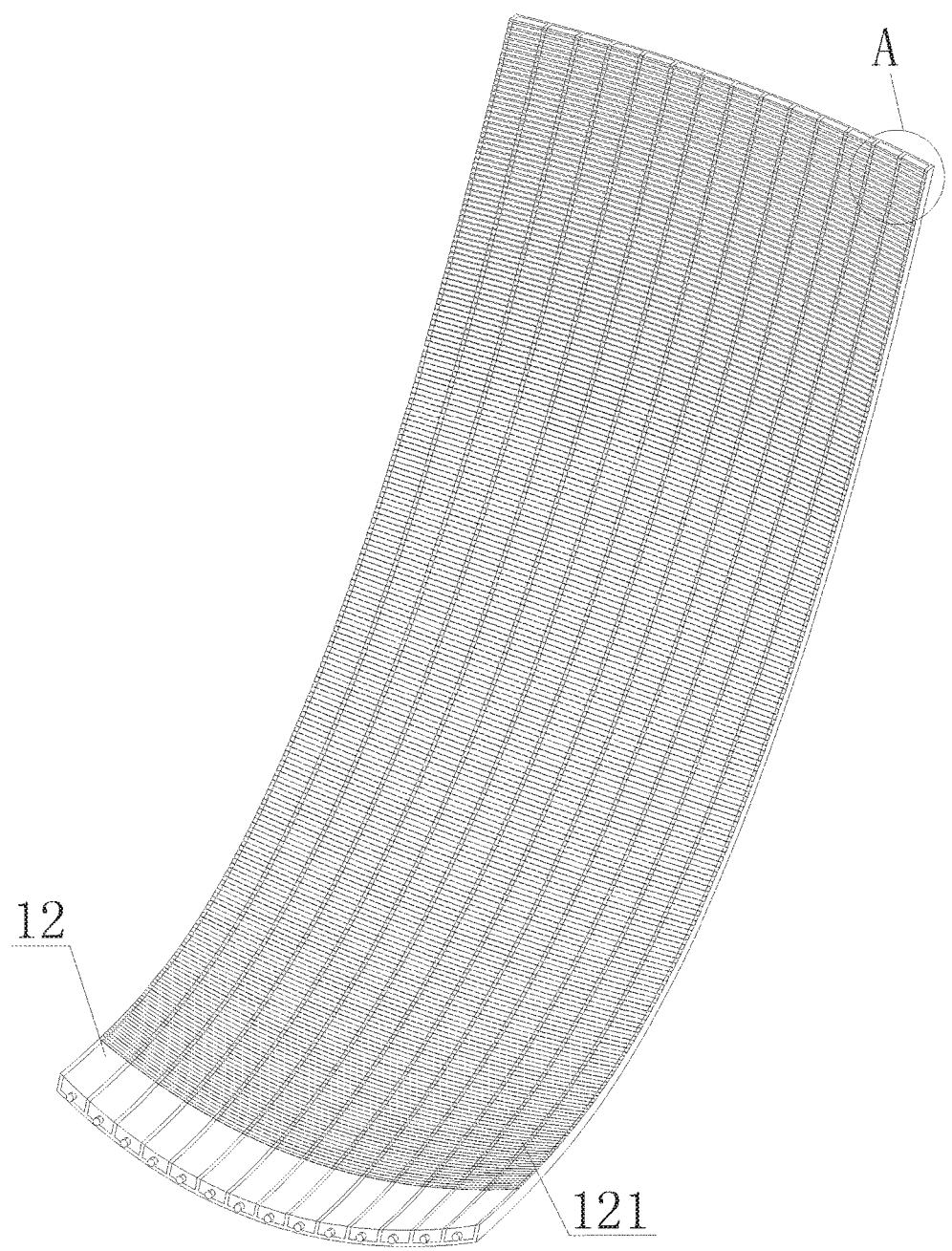
FIG. 6 is a structural schematic diagram of an embodiment 5.
Figure 7:
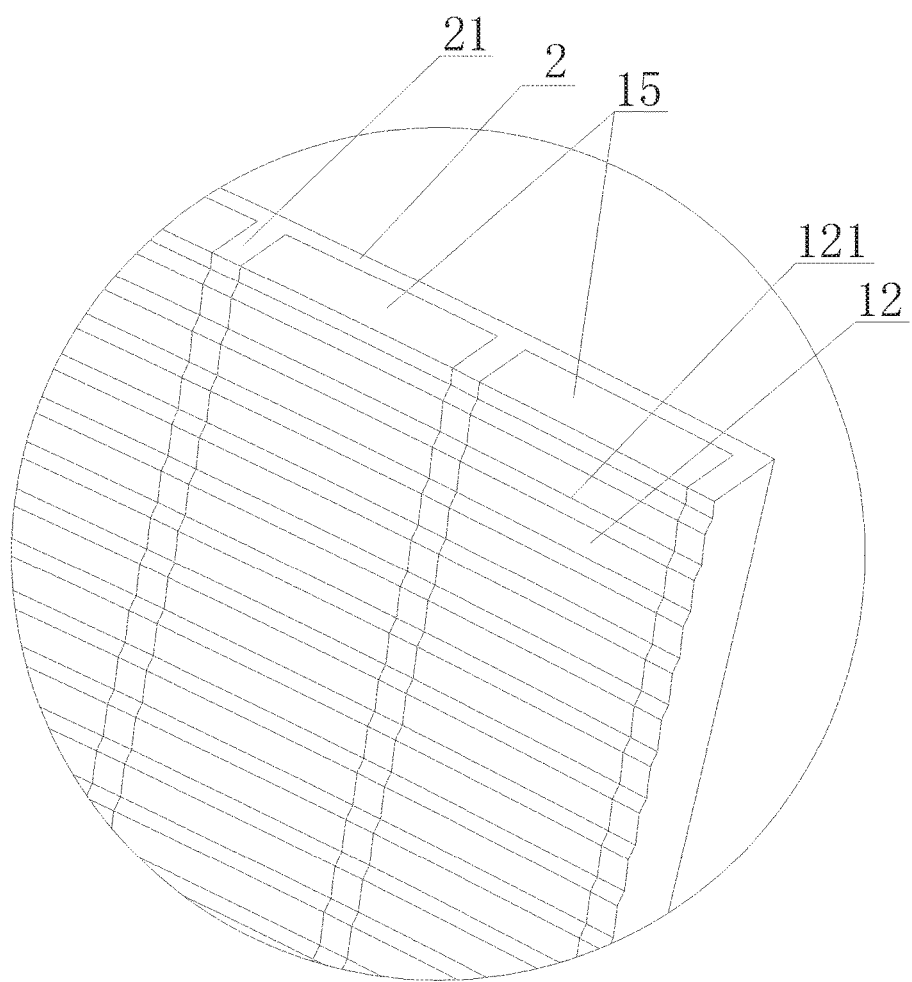
FIG. 7 is an enlarged schematic diagram of a region A in FIG. 6.

Refer to FIG. 6 to FIG. 7, in the embodiment, the reflective surface 12 of the light guide structure 1 is provided with reflecting fringes 121 which are strip-shaped or dot-shaped bulges or depressions and are used for reflecting rays, and when being reflected on the reflecting fringes 121, the rays may be reflected towards a required direction and then emitted by an emergent surface 11 of the light guide structure 1 after a total reflection condition is destroyed. The reflective surface 12 in the light guide structure are used for reflecting light emitted to the reflective surface 12 back to the inside of the light guide structure 1 and forming total reflection to provide input rays for the reflecting fringes 121 at a rear section, and such circulation is made to the end, so that most of light energy may be reflected, furthermore, the utilization rate of the light is increased, and the brightness is improved.

Due to the design of the reflecting fringes 121, the LED light sources 3 may be sufficiently utilized by the light guide structure 1, the loss may be reduced, and all the rays may be emitted from the emergent surface 11, so that more energy is saved.

The above specific embodiments are merely intended to explain the present invention, rather than to limit the present invention, the embodiments may be modified without creative contribution as required by the skilled in the art after the description is read, and all the modifications within the scope of the claims of the present invention are protected by the patent law.

The invention claimed is:

1. A light and thin tail lamp, comprising:
a light guide structure and a lampshade, the light guide structure being arranged in the lampshade, one surface of the light guide structure being an emergent surface, and the other surface of the light guide structure being a reflective surface; two incident surfaces being arranged on opposite positions at two sides of the light guide structure, at least one of the incident surfaces being provided with light sources, and rays emitted from the light sources entering the light guide structure through the corresponding incident surface; and the light sources being connected with a control circuit,
wherein the light guide structure comprises a plurality of light guide regions, each of the light guide regions is provided with the light sources, and spacing strips are snugly fitted between every two adjacent light guide regions,
wherein the spacing strips and the lampshade are made of the same material, and the spacing strips are used as a part of the lampshade and are integrally formed with the lampshade, and
wherein the light guide structure with a high refractive index is provided on the lampshade with a low refractive index.

2. The light and thin tail lamp of claim 1, wherein each of the light guide regions corresponds to one of the light sources with different colors.

3. The light and thin tail lamp of claim 1, wherein the reflective surface is provided with reflecting fringes.

4. The light and thin tail lamp of claim 1, wherein the light guide structure comprises a plurality of strip-shaped light guide strips spliced side by side, and each of the light guide strips corresponds to one of the light sources.

5. The light and thin tail lamp of claim 1, wherein the reflective surface is provided with reflecting fringes.

6. The light and thin tail lamp of claim 1, wherein the light guide structure is an arc-shaped structure.

7. The light and thin tail lamp of claim 4, wherein the spacing strips for spacing the light guide strips are arranged between adjacent light guide strips.

8. The light and thin tail lamp of claim 7, wherein the spacing strips are fixed on the lampshade, the spacing strips and the lampshade form mounting grooves of the light guide strips, and the light guide strips are mounted in the mounting grooves.

9. The light and thin tail lamp of claim 7, wherein the spacing strips and the lampshade are made of the same material, and the spacing strips are used as a part of the lampshade and are integrally formed with the lampshade.

10. The light and thin tail lamp of claim 9, wherein the light guide strips with a high refractive index are provided on the lampshade with a low refractive index.

11. The light and thin tail lamp of claim 10, wherein the reflective surface is provided with reflecting fringes.

* * * * *